US012548214B2

(12) United States Patent
Ueta

(10) Patent No.: US 12,548,214 B2
(45) Date of Patent: Feb. 10, 2026

(54) INFORMATION PROCESSING DEVICE, INFORMATION PROCESSING METHOD, AND PROGRAM

(71) Applicant: Panasonic Intellectual Property Management Co., Ltd., Osaka (JP)

(72) Inventor: Daisuke Ueta, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 187 days.

(21) Appl. No.: 18/287,834

(22) PCT Filed: Apr. 8, 2022

(86) PCT No.: PCT/JP2022/017335
§ 371 (c)(1),
(2) Date: Oct. 20, 2023

(87) PCT Pub. No.: WO2022/230639
PCT Pub. Date: Nov. 3, 2022

(65) Prior Publication Data
US 2024/0273791 A1    Aug. 15, 2024

(30) Foreign Application Priority Data
Apr. 30, 2021    (JP) .................................. 2021-077603

(51) Int. Cl.
*G06T 11/60*    (2006.01)
(52) U.S. Cl.
CPC .................................. *G06T 11/60* (2013.01)

(58) Field of Classification Search
CPC ... G06T 11/60; G06T 2200/24; G06T 11/206; G06V 10/772; G06V 10/774;
(Continued)

(56) References Cited

U.S. PATENT DOCUMENTS

2019/0377071 A1*  12/2019  Cheng .................... G06V 20/64
2020/0065992 A1*   2/2020  Sung ..................... G06V 10/764
(Continued)

FOREIGN PATENT DOCUMENTS

JP          2020-061164         4/2020

OTHER PUBLICATIONS

International Search Report issued in International Pat. Appl. No. PCT/JP2022/017335, dated Jul. 5, 2022, along with an English language translation thereof.
(Continued)

*Primary Examiner* — Said Broome
*Assistant Examiner* — Andrew Shin
(74) *Attorney, Agent, or Firm* — GREENBLUM & BERNSTEIN, P.L.C.

(57)    ABSTRACT

This information processing device comprises: a generation circuit that, on the basis of attribute information of first image data resulting from imaging a first object in a first environment, generates second image data that reproduces an image in which a second object differing from the first object is disposed in the first environment; an evaluation circuit that evaluates the accuracy of image recognition for the second object on the basis of the second image data; and an output circuit that outputs the accuracy evaluation results.

12 Claims, 10 Drawing Sheets

| False recognition image | Registered evaluation image | Attribute control | Attribute control intensity | Pseudo-evaluation image | Recognition score | Recognition result | Add to learning |
|---|---|---|---|---|---|---|---|
|  |  | N/A | 0 |  | 0.2 | False recognition | ☑ |
|  |  | Direction change | 3 |  | 0.4 | False recognition | ☑ |
|  |  | Reflection | 4 |  | 0.8 | Correct recognition | ☐ |
| ... | ... | ... | ... | ... | ... | ... | ... |

(58) Field of Classification Search
CPC .... G06V 10/945; G06V 10/82; G06V 10/776; G06V 10/987
See application file for complete search history.

(56) References Cited

U.S. PATENT DOCUMENTS

2021/0350145 A1* 11/2021 Park .................... G06T 7/246
2022/0230423 A1*  7/2022 Takahashi ............ G06V 10/26

OTHER PUBLICATIONS

Weihong Xu, et al., "RelightGAN: Instance-level Generative Adversarial Network for Face Illumination Transfer", IEEE Transactions on Image Processing, vol. 30, Jan. 1, 2021.
Extended European Search Report dated Sep. 10, 2024 issued in European patent application No. 22795554.9.

* cited by examiner

| False recognition image | Registered evaluation image | Attribute control | Attribute control intensity | Pseudo-evaluation image | Recognition score | Recognition result | Add to learning |
|---|---|---|---|---|---|---|---|
| (tea bottle) | (noodle cup) | N/A | 0 | (noodle cup) | 0.2 | False recognition | ☑ |
| (tea bottle) | (noodle cup) | Direction change | 3 | (noodle cup) | 0.4 | False recognition | ☑ |
| (tea bottle) | (noodle cup) | Reflection | 4 | (noodle cup) | 0.8 | Correct recognition | ☐ |
| ... | ... | ... | ... | ... | ... | ... | ... |

FIG. 8

| False recognition image | Registered evaluation image | Attribute control | Attribute control intensity | Pseudo-evaluation image | Recognition score | Recognition result | Add to learning |
|---|---|---|---|---|---|---|---|
| (TEA bottle) | (NOODLE cup) | N/A | 0 | (NOODLE cup) | 0.2 | False recognition | ☑ |
| (TEA bottle) | (NOODLE cup) | Direction change | 3 | (NOODLE cup) | 0.4 | False recognition | ☑ |
| (TEA bottle) | (NOODLE cup) | Reflection | 4 | (NOODLE cup) | 0.8 | Correct recognition | ☐ |
| ... | ... | ... | ... | ... | ... | ... | ... |

FIG. 9

INFORMATION PROCESSING DEVICE, INFORMATION PROCESSING METHOD, AND PROGRAM

TECHNICAL FIELD

The present disclosure relates to an information processing apparatus, an information processing method, and a program.

BACKGROUND ART

In retail stores such as supermarkets and convenience stores, a method of identifying products by image recognition (e.g., product recognition method) has been considered (see, for example, Patent Literature 1).

CITATION LIST

Patent Literature

PTL 1
Japanese Patent Application Laid-Open No. 2020-061164

SUMMARY OF INVENTION

There is scope for further study, however, on a method of reducing a false recognition rate of the image recognition in the product recognition. Particularly, in the recognition environment for a misrecognized object, a method of preventing misrecognition of another object has not been considered.

One non-limiting and exemplary embodiment of the present disclosure facilitates providing an information processing apparatus, an information processing method, and a program each capable of evaluating image recognition accuracy for different objects in a case where the different objects could be image recognition targets in a particular environment.

An information processing apparatus according to an embodiment of the present disclosure includes: generation circuitry, which, in operation, generates, based on attribute information of first image data resulting from capturing a first object in a first environment, second image data that simulates an image in which a second object other than the first object is placed in the first environment; evaluation circuitry, which, in operation, evaluates accuracy of image recognition for the second object based on the second image data; and output circuitry, which, in operation, outputs an evaluation result of the accuracy.

It should be noted that general or specific embodiments may be implemented as a system, an apparatus, a method, an integrated circuit, a computer program, a storage medium, or any selective combination thereof.

According to an exemplary embodiment of the present disclosure, it is possible to evaluate image recognition accuracy for different objects in a case where the different objects could be image recognition targets in a particular environment.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF DRAWINGS

FIG. 8 illustrates an exemplary display of false recognition risk;

FIG. 9 illustrates another exemplary display of false recognition risk; and

DESCRIPTION OF EMBODIMENTS

Hereinafter, embodiments of the present disclosure will be described in detail with reference to the accompanying drawings.

For example, studies have been carried out on a system (for example, referred to as a "product recognition system") for recognizing a product by image recognition at a checkout table (or register) installed in a retail store. Note that the "product" is an example of an "object". For example, the image recognition target need not be limited to a product.

In image recognition, for example, the lighting environment may vary for each store. For example, in a case where the lighting environment is different from an environment for product model learning (for example, referred to as a "learning environment"), false recognition (for example, including non-recognition) of a product possibly occurs.

When the cause of false recognition of a product is the difference between the learning environment and an environment for product recognition (for example, referred to as a "recognition environment"), false recognition possibly occurs for another product in the same recognition environment. To be more specific, when a shadow etc. on a product in the recognition environment is the cause of false recognition, a similar shadow is highly likely to be generated for another product. Thus, when false recognition occurs for a certain product, it is sometimes desirable to evaluate (or estimate) the risk of false recognition occurring in image recognition for another product (e.g., "false recognition risk") in the recognition environment in which the product has been misrecognized. In other words, in an environment in which false recognition has occurred for a certain product, it is sometimes desirable to evaluate whether false recognition could occur for another product.

Here, in the evaluation of false recognition risk for a product other than the product for which false recognition has occurred, it is sometimes difficult to faithfully reproduce the previous recognition environment (e.g., lighting environment) in which the false recognition has occurred, and it may also be difficult to evaluate the false recognition risk for another product at the time of occurrence of the false recognition.

In an embodiment of the present disclosure, for example, a description will be given of a method of determining (or evaluating) false recognition risk of a product other than the product for which false recognition has occurred in the recognition environment in which the false product recognition has occurred.

Embodiment 1

[Configuration of Product Recognition System]

Figure 1:
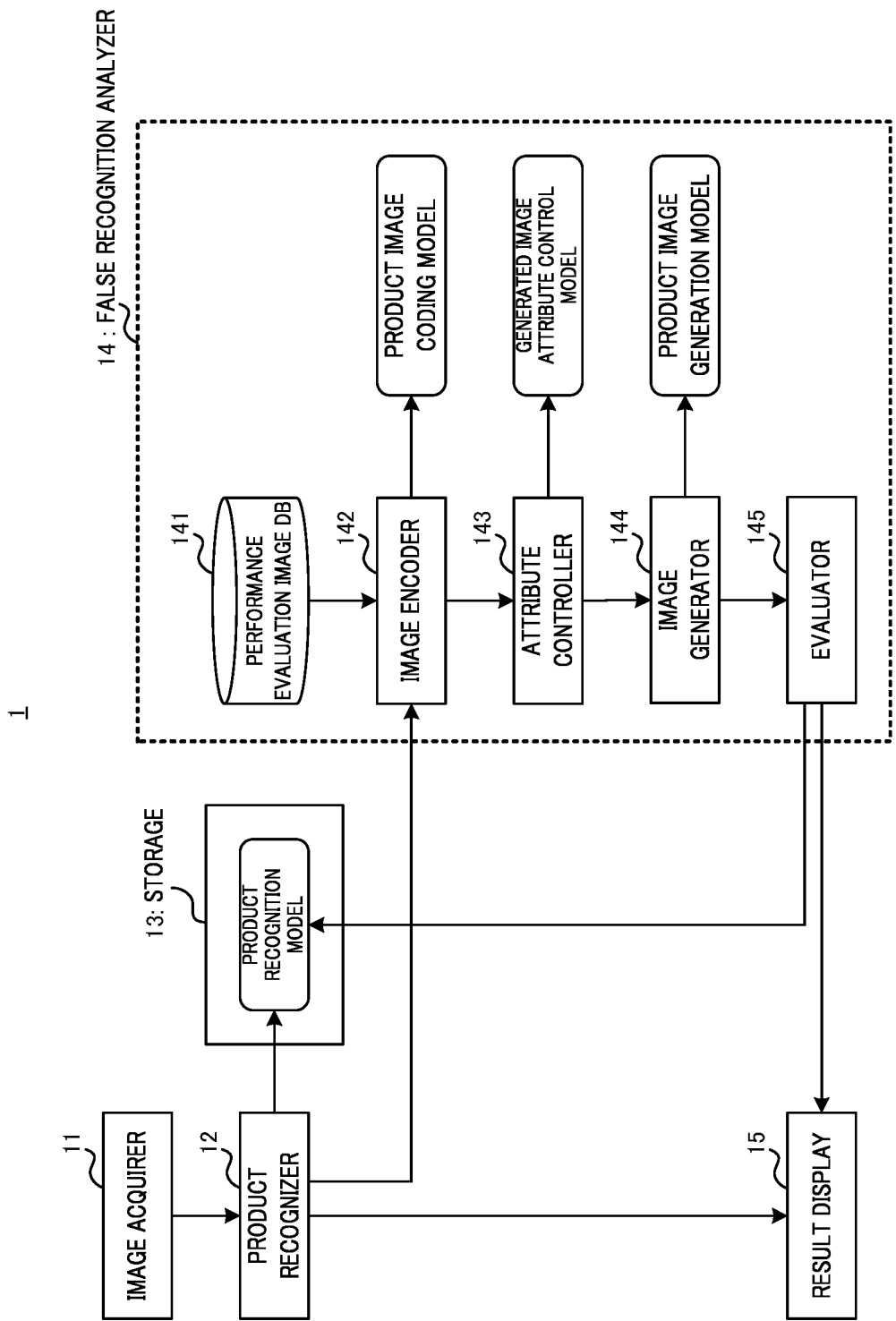
FIG. 1 illustrates an exemplary configuration of a product recognition system.

FIG. 1 illustrates an exemplary configuration of product recognition system 1 according to the present embodiment.

Product recognition system 1 illustrated in FIG. 1 may include, for example, image acquirer 11, product recognizer 12, storage 13, false recognition analyzer 14, and result display 15. False recognition analyzer 14 may be replaced with another term such as a "false recognition determination apparatus", an "image recognition apparatus", an "image processing apparatus", or an "information processing apparatus", for example.

Image acquirer 11 acquires, for example, image data (e.g., product image data) including a product at a location (e.g., checkout table) where image recognition is performed by product recognizer 12. For example, image acquirer 11 may acquire the product image data obtained by capturing a product present at a location where image recognition is performed at the time of checkout by a camera (not illustrated). The acquired product image data is transmitted from image acquirer 11 to product recognizer 12, for example.

Product recognizer 12 may recognize, for example, an image of a product to be paid (e.g., purchased) by a customer of the store. Product recognizer 12 may recognize a product corresponding to the product image data inputted from image acquirer 11 based on, for example, a learned product recognition model (hereinafter, referred to as a "product recognition model") stored in storage 13. Information indicating the product recognition result may be outputted from product recognizer 12 to result display 15, for example.

For example, product recognizer 12 may also determine whether false recognition has occurred for the product recognition result. For example, product recognizer 12 may detect the occurrence of false recognition based on a determination of a user (e.g., store clerk or customer) at the time of checkout. To be more specific, product recognizer 12 may detect that the false recognition has occurred when the user inputs that the false recognition has occurred. In addition, product recognizer 12 may detect the occurrence of false recognition at a timing other than the time of checkout, for example. Product recognizer 12 may detect that false recognition has occurred, for example, when sales data of the store is inconsistent with the actual inventory and theoretical sales in aggregating the data. When false recognition has occurred, the product image data of the product for which the false recognition has occurred may be outputted from product recognizer 12 to false recognition analyzer 14, for example.

Storage 13 stores, for example, a product recognition model. The product recognition model may include, for example, product image data and information on a product such as a product name.

False recognition analyzer 14 evaluates, for example, accuracy of image recognition of a product. As an example of an accuracy indicator, an indicator indicating a possibility of false recognition (hereinafter, referred to as "false recognition risk") may be determined (judged or evaluated) in false recognition analyzer 14.

For example, false recognition analyzer 14 generates, based on attribute information (for example, simply referred to as an "attribute") of image data obtained by capturing a product in a recognition environment (e.g., first environment) of product recognizer 12, image data including a different product in the recognition environment (e.g., first environment), and evaluates the image recognition accuracy for the different product based on the generated image data.

The attribute in the image data is information in a relationship where the feature amount of the image changes according to the attribute changes. The attribute is, for example, information on the feature amount in the image. For example, non-limiting examples of the attribute configured in product recognition system 1 include attributes such as a lighting direction, lighting intensity, lighting color temperature, blurriness, direction of a recognition target (e.g., product), intensity of reflection, and individual difference of the recognition target. Note that the type of attribute is not limited to these, and may include, for example, other features related to product recognition.

For example, false recognition analyzer 14 may acquire product image data (hereinafter, also referred to as "false recognition image data") of a product determined to be misrecognized in the image recognition by product recognizer 12. Further, false recognition analyzer 14 may change the attribute information of product image data (also referred to as "evaluation image data") of a product other than the product determined to be misrecognized, for example, based on the attribute information of the false recognition image data. False recognition analyzer 14 may then evaluate the image recognition accuracy of the product, for example, based on the image data with changed attribute information (hereinafter, referred to as "pseudo-evaluation image data").

False recognition analyzer 14 may, for example, output information on the evaluation result of image recognition accuracy to result display 15.

Result display 15 (or output) may display (or output) the product recognition result inputted from product recognizer 12, for example. Result display 15 may also display (or output) information on the false recognition risk determined in false recognition analyzer 14, for example. Exemplary methods of displaying the false recognition risk on result display 15 will be described later.

Note that at least one of image acquirer 11, product recognizer 12, storage 13, and result display 15 may or may not be included in false recognition analyzer 14.

[Exemplary Configuration of False Recognition Analyzer 14]

False recognition analyzer 14 may include, for example, performance evaluation image database (DB) 141, image encoder 142, attribute controller 143, image generator 144, and evaluator 145. For example, attribute controller 143 and image generator 144 may correspond to generation circuitry.

Performance evaluation image DB 141 stores, for example, image data (e.g., evaluation image data) of products that can be handled at a store.

Image encoder 142 encodes, for example, false recognition image data inputted from product recognizer 12. Image encoder 142 also encodes at least one piece of evaluation image data stored in performance evaluation image DB 141, for example. Image encoder 142 may encode the false recognition image data and the evaluation image data, for example, based on a product image coding model. Image encoder 142 outputs, for example, coding information of the false recognition image and the evaluation image (e.g., code related to at least one attribute) to attribute controller 143.

Exemplary product image coding models (or coding methods) include, for example, a method of obtaining a real vector of a certain number of dimensions by convolution of an image, such as an encoder of deep learning, or a method of generating an image from a code (e.g., real vector) using an image generation model and searching for a code for obtaining an image closer to the false recognition image.

Attribute controller 143 may control, for example, the attribute information in the coding information of the evaluation image data inputted from image encoder 142. Attribute controller 143 may also control, for example, the attribute in the coding information of false recognition image data inputted from image encoder 142. Attribute controller 143 may perform the attribute control, for example, based on the generated image attribute control model. Note that the term "control" may be replaced with another term such as "adjustment" or "change".

Further, for example, attribute controller 143 may apply (or reflect), to the evaluation image data, the attribute information (e.g., first attribute) on the lighting environment (e.g., lighting condition) among the attribute information included in the coding information of the false recognition image data. For example, attribute controller 143 may mix the attribute information on the lighting environment of the false recognition image data and the attribute information on the lighting environment of the evaluation image data, and may replace the attribute information on the lighting environment of the evaluation image data with the attribute information on the lighting environment of the false recognition image data.

Further, for example, attribute controller 143 may adjust, for the evaluation image data, at least one of the attribute information (e.g., first attribute) on the lighting environment and the attribute (e.g., second attribute regarding a recognition target object) on the feature amount other than the lighting environment. Note that the second attribute may be an attribute related to the surrounding environment that is different from the lighting or the object.

Attribute controller 143 outputs, for example, the coding information of the evaluation image after the attribute control to image generator 144.

Image generator 144 generates (i.e., decodes) image data (e.g., pseudo-evaluation image data) based on, for example, the coding information of the evaluation image inputted from attribute controller 143. Image generator 144 may generate an image based on, for example, a product image generation model. Image generator 144 may generate pseudo-evaluation image data using, for example, a generator in deep learning. Image generator 144 outputs, for example, the generated pseudo-evaluation image data to evaluator 145.

Evaluator 145 may evaluate the product recognition accuracy for the pseudo-evaluation image data inputted from image generator 144 based on the product recognition model stored in storage 13. For example, evaluator 145 may determine the false recognition risk of the evaluation target product corresponding to the pseudo-evaluation image data based on the product recognition result. For example, evaluator 145 may output information on the evaluation result for the pseudo-evaluation image data to result display 15.

[Exemplary Operation of Product Recognition System 1]

Next, an exemplary operation of the above product recognition system 1 will be described.

Figure 2:
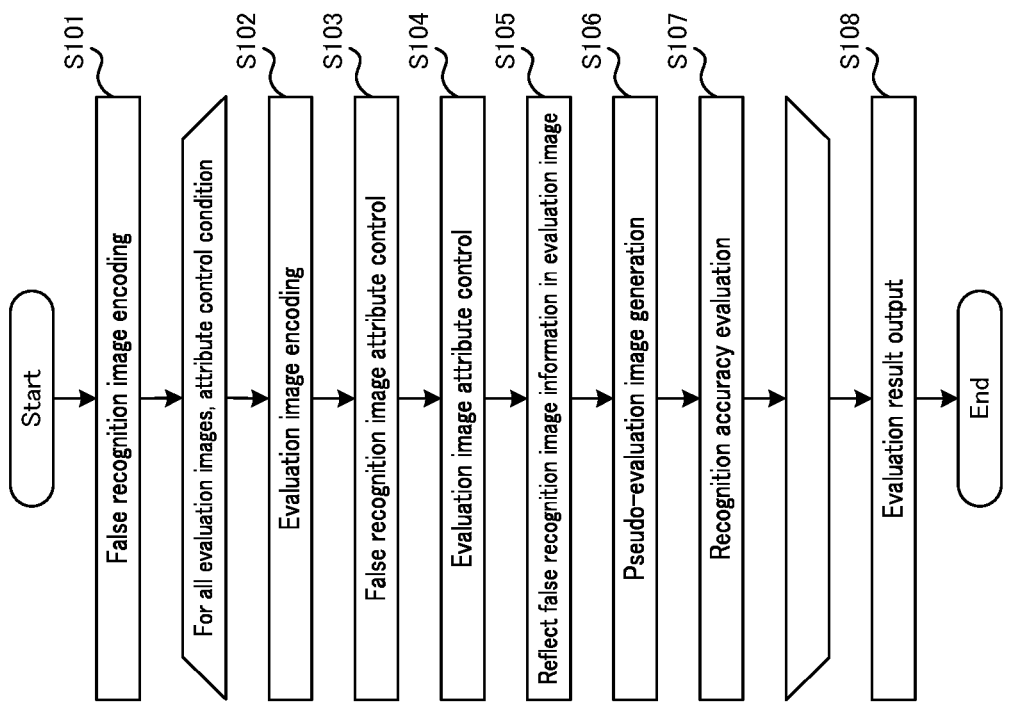
FIG. 2 is a flowchart describing an exemplary operation of the product recognition system.

FIG. 2 is a flowchart describing an exemplary operation of false recognition analyzer 14 of product recognition system 1. False recognition analyzer 14 may perform the processing described in FIG. 2 when, for example, product recognizer 12 detects the occurrence of product false recognition.

In FIG. 2, false recognition analyzer 14 encodes, for example, false recognition image data inputted from product recognizer 12 (S101).

For example, false recognition analyzer 14 may perform processing related to the recognition accuracy evaluation in the following S102 to S107 on at least one evaluation image (i.e., at least one product image), or may perform the processing for at least one attribute control operation (e.g., attribute control condition). For example, the target product of the recognition accuracy evaluation may be determined in advance, or may be selected by receiving an input by a user. The condition of the attribute control to be applied in the recognition accuracy evaluation may be determined in advance or may be selected by receiving an input by a user.

False recognition analyzer 14, for example, encodes the evaluation image data (S102).

For example, false recognition analyzer 14 may perform at least one attribute control operation (e.g., attribute conversion or adjustment) on the coding information of the false recognition image data (S103).

For example, false recognition analyzer 14 may perform at least one attribute control operation on the coding information of the evaluation image data (S104).

For example, false recognition analyzer 14 may perform a predetermined attribute control operation on at least one of the false recognition image and evaluation image. The attribute control operation may include, for example, a control operation of an attribute such as a lighting direction, lighting intensity, lighting color temperature, reflection intensity, direction of a recognition target object (e.g., product), and individual difference of the object.

For example, in the process of S103, false recognition analyzer 14 may adjust an attribute related to the lighting environment (e.g., lighting direction, intensity, or color temperature) with respect to the coding information of the false recognition image data. This adjustment makes it possible to simulate, for example, an environment darker or brighter than the real lighting environment.

Further, for example, in the process of S104, false recognition analyzer 14 may adjust an attribute related to the evaluation target object (e.g., direction of the object or individual difference) with respect to the coding information of the evaluation image data. This adjustment makes it possible to simulate various states of the product.

Note that false recognition analyzer 14 need not perform the process of attribute control in either one or both of S103 and S104, for example.

For example, false recognition analyzer 14 reflects information on the false recognition image data in information on the evaluation image data (S105). For example, false recognition analyzer 14 may reflect the attribute information on the lighting environment of the image recognition (or referred to as "lighting environment information") among the attribute information included in the coding information of the false recognition image data in the coding information (e.g., lighting environment information) of the evaluation image data. Note that the term "reflect" may be replaced with another term such as "update", "replace", "configure", "apply", or "mix". For example, false recognition analyzer 14 may perform processing such as styleMixing between the lighting environment information (or code) of the false recognition image data and the lighting environment information (or code) of the evaluation image data.

For example, false recognition analyzer 14 generates pseudo-evaluation image data based on the coding information of the evaluation image data in which the lighting environment information of the false recognition image data is reflected (S106). In other words, the evaluation image data is converted into the pseudo-evaluation image data based on the false recognition image data.

False recognition analyzer 14 evaluates the recognition accuracy (e.g., recognition success rate or false recognition risk) of a product corresponding to the evaluation image data based on, for example, the pseudo-evaluation image data (S107).

False recognition analyzer 14, for example, outputs the evaluation result of the recognition accuracy to result display 15 (S108).

[Methods of Generating Pseudo-Evaluation Image Data]

In the following, exemplary methods of generating the pseudo-evaluation image data will be described.

Generation Method 1

In Generation Method 1, for example, the pseudo-evaluation image data may be generated by performing predetermined image processing on the entire evaluation image data. For example, false recognition analyzer 14 may generate the pseudo-evaluation image data by performing image processing such as gamma correction or addition (or removal) of Gaussian noise on the evaluation image data.

For example, false recognition analyzer 14 may generate the pseudo-evaluation image data for which the lighting environment corresponding to the false recognition image data is pseudo-reproduced, by adjusting the gamma correction value or the Gaussian noise value (e.g., attribute information regarding the brightness of the false recognition image data) in the false recognition image data.

In Generation Method 1, the pseudo-evaluation image data can be generated by a simple procedure, thereby reducing the computational complexity (or processing load) of the pseudo-evaluation image data generation.

Generation Method 2

In Generation Method 2, for example, false recognition analyzer 14 may generate pseudo-evaluation image data using a three-dimensional model. For example, false recognition analyzer 14 may generate a three-dimensional model of an evaluation target object (e.g., product), and generate the pseudo-evaluation image data for which the lighting environment in the three-dimensional model is controlled based on the recognition environment corresponding to the false recognition image data (e.g., attribute information regarding the recognition environment where the false recognition is determined).

For example, false recognition analyzer 14 may reproduce, in the three-dimensional model, the lighting environment such as the number, types, positions, or intensity of lights, and the surrounding environment such as the position, color, and material of an object (e.g., wall or mirror) around the place where the product recognition is performed, based on the recognition environment corresponding to the false recognition image data. Further, false recognition analyzer 14 may reproduce, for example, a product to be evaluated for the recognition accuracy in the three-dimensional model based on the evaluation image data.

In Generation Method 2, for example, to reproduce the lighting environment, a three-dimensional model of an object around a place where the product recognition is performed is generated in addition to the lighting state. In addition, at least one of the light source positions and the light amounts of a plurality of lights actually present is reproduced. Further, an individual three-dimensional model is generated for each recognition target object even for the same product in order to reproduce the individual difference between the products. Thus, in Generation Method 2, when these data can be accurately collected, it is possible to reproduce high-quality pseudo-evaluation image data that accurately reflects the surrounding environment, the light source, and the recognition target object.

Generation Method 3

In Generation Method 3, for example, false recognition analyzer 14 generates the pseudo-evaluation image data by encoding the evaluation image data and reflecting the attribute obtained by encoding the false recognition image data. For this reflection of the attribute, false recognition analyzer 14 may convert the evaluation image data (i.e., generate the pseudo-evaluation image data) using generative adversarial networks (GAN). GAN is one of image generation techniques based on a machine-learning model using a neural network such as deep learning. In the present embodiment, false recognition analyzer 14 uses GAN for generating the pseudo-evaluation image data, for example. In other words, in the present embodiment, GAN may be used for generating evaluation data instead of generating learning data in machine learning.

For example, false recognition analyzer 14 may generate the pseudo-evaluation image data by adjusting a configuration value (e.g., feature amount) of at least one attribute of the evaluation image data based on the attribute of the false recognition image data. For example, false recognition analyzer 14 may pseudo-alter the lighting environment in the evaluation image data by adjusting the attribute related to the lighting environment. In addition, for example, false recognition analyzer 14 may pseudo-alter the direction of an object in the evaluation image data by adjusting the attribute related to the direction of the object. Note that false recognition analyzer 14 may apply any attribute, such as the direction or the lighting environment specified by a user, to the evaluation image data in addition to reflecting the attribute of the false recognition image data in the evaluation image data.

In Generation Method 3, for example, it is possible to change a plurality of attributes individually, thereby adjusting the lighting environment for the evaluation image data more finely than in Generation Method 1. In addition, Generation Method 3 makes it possible to change an attribute such as the capturing angle (e.g., direction of a product), lighting direction, or individual difference of a recognition target, for example, thereby reproducing a state that cannot be reproduced by Generation Method 1.

Further, in Generation Method 3, the pseudo-evaluation image data can be generated by, for example, controlling an attribute (e.g., some code of coding information) related to the lighting environment. In Generation Method 3, the pseudo-evaluation image data can also be generated by the attribute control without training data. That is, it is possible to generate the pseudo-evaluation image data without preparing an enormous amount of data in Generation Method 3. Thus, as compared with Generation Method 2, Generation Method 3 makes it possible to easily evaluate the image recognition accuracy for a product other than the product determined to be misrecognized, and to reduce the computational complexity (or processing load) of the pseudo-evaluation image data generation.

Note that the machine-learning model used for generating the pseudo-evaluation image data in Generation Method 3 is not limited to GAN and may be another model.

[Exemplary Display of False Recognition Risk]

False recognition analyzer 14 may output, to result display 15, a signal for displaying the evaluation result of the false recognition risk (or indicator related to recognition accuracy) of products corresponding to a plurality of pieces of evaluation image data, for example. In false recognition analyzer 14, for example, a signal for displaying the evaluation result may be outputted from evaluator 145 to result display 15, or may be outputted from an output (not illustrated) to result display 15.

Result display 15 may display the evaluation result of the false recognition risk (or indicator related to recognition accuracy) of a product based on the signal from false recognition analyzer 14. The form of display is not limited. As a non-limiting example, a graph display may be applied, or a list display may be applied.

In the following, exemplary display of the false recognition risk will be described.

Display Example 1

FIGS. 3, 4, 5, and 6 each illustrate an exemplary display screen for the false recognition risk in Display Example 1.

The screens illustrated in FIG. 3, FIG. 4, FIG. 5, and FIG. 6 may each include, for example, an area for selecting a condition on the recognition performance evaluation (e.g., "recognition performance evaluation condition selection" area), an area for displaying a result of the recognition performance evaluation (e.g., "recognition performance evaluation result" area), and an area for displaying a result of a lighting environment suggestion (e.g., "lighting suggestion result" area).

The "recognition performance evaluation condition selection" area may include, for example, an area for prompting a user to select a false recognition image for reproducing the lighting condition. Note that a signal (may be referred to as an operation signal) corresponding to an operation (e.g., selection operation such as touching or clicking) on the screen by the user is inputted to result display 15 (or false recognition analyzer 14), and a process (display control may be included, for example) corresponding to the operation signal is executed.

The "recognition performance evaluation condition selection" area may include, for example, an area for selecting an evaluation image for displaying a result of the recognition performance evaluation. The evaluation image for displaying the result of the recognition performance evaluation may include, for example, an evaluation image stored in performance evaluation image DB 141 (e.g., referred to as "performance evaluation image original"), and an evaluation image obtained by applying the condition (e.g., referred to as "false recognition condition") of the lighting environment in which the false recognition has occurred to the evaluation image stored in performance evaluation image DB 141 (e.g., referred to as "false recognition condition applied image").

The false recognition condition applied image may also include, for example, evaluation image data to which attribute control other than the false recognition condition is applied. In the examples illustrated in FIG. 3 to FIG. 6, attributes such as the direction of a target object, individual difference of the target object, lighting direction, lighting intensity, lighting color temperature, and reflection intensity can be selected as the attribute control. Note that the selectable attributes are not limited to these and may include another attribute. For example, when certain attribute control is selected, false recognition analyzer 14 may apply a predetermined configuration value (also referred to as attribute control intensity) for the attribute control, or may determine the configuration value by receiving an input by a user (e.g., input from another screen).

In addition, the "recognition performance evaluation condition selection" area may include, for example, an area for prompting a user to select (or determine) whether to present the lighting environment suggestion.

For example, the user may select false recognition image data (file name: false_images in FIG. 3 to FIG. 6) for reproducing the false recognition condition and an evaluation image of the recognition performance evaluation target on the screen, and press the "Enter" button. Further, for example, the user may select presentation of the lighting environment suggestion on the screen and press the "Enter" button. For example, when detecting that the user has pressed the enter button, false recognition analyzer 14 may start processing related to the recognition performance evaluation (e.g., pseudo-evaluation image data generation and recognition performance evaluation).

As illustrated in FIG. 3 to FIG. 6, the evaluation result of the recognition performance for the evaluation image may be, for example, information (e.g., "recognition rate" or correct recognition rate) indicating a probability of successful recognition of the corresponding product in the evaluation image data in the product recognition. For example, the lower the recognition rate, the higher the probability of false recognition (i.e., false recognition risk or recognition failure rate) for the corresponding product.

The recognition rate may be calculated based on, for example, whether the result obtained by recognizing the pseudo-evaluation image data with the product recognition model matches the correct product. For example, false recognition analyzer 14 may configure the recognition rate high when a product evaluated to have the highest similarity to the pseudo-evaluation image data by the product recognition model matches the correct product. On the contrary, false recognition analyzer 14 may configure the recognition rate low when a product evaluated to have the highest similarity to the pseudo-evaluation image data by the product recognition model does not match the correct product since it is possibly recognized as an incorrect product.

Further, even in the case where the product evaluated to have the highest similarity matches the correct product, when the recognition score for another product is also high, it is possibly misrecognized as another product with slight environmental change. Thus, when the similarity is high for a plurality of products, false recognition analyzer 14 may configure the false recognition rate higher than when the similarity is high only for the correct product. When the similarity is low (e.g., lower than a predetermined threshold) for all products, the recognition of the product by the product recognition model is difficult, and thus false recognition analyzer 14 may configure the recognition rate low.

Note that the evaluation result of the recognition performance is not limited to the recognition rate and may be another parameter. Examples of the parameter include information indicating a probability of product recognition failure (e.g., "false recognition rate"), or the above-described similarity.

False recognition analyzer 14 may determine, for example, whether the recognition rate of each product (also referred to as a class, for example) is higher than a predetermined threshold (recognition rate of 95% in FIG. 3 to FIG. 6). For example, information on a product with a recognition rate lower than the threshold (e.g., the number of failed classes) may be displayed on the screen. In the examples of FIG. 3 to FIG. 6, false recognition analyzer 14 may output, to result display 15, a signal for displaying the evaluation results (e.g., recognition rates) for the respective products in a graph. The graph display allows a user to see the recognition performance across a plurality of products to which the false recognition condition is applied, for example.

Figure 4:
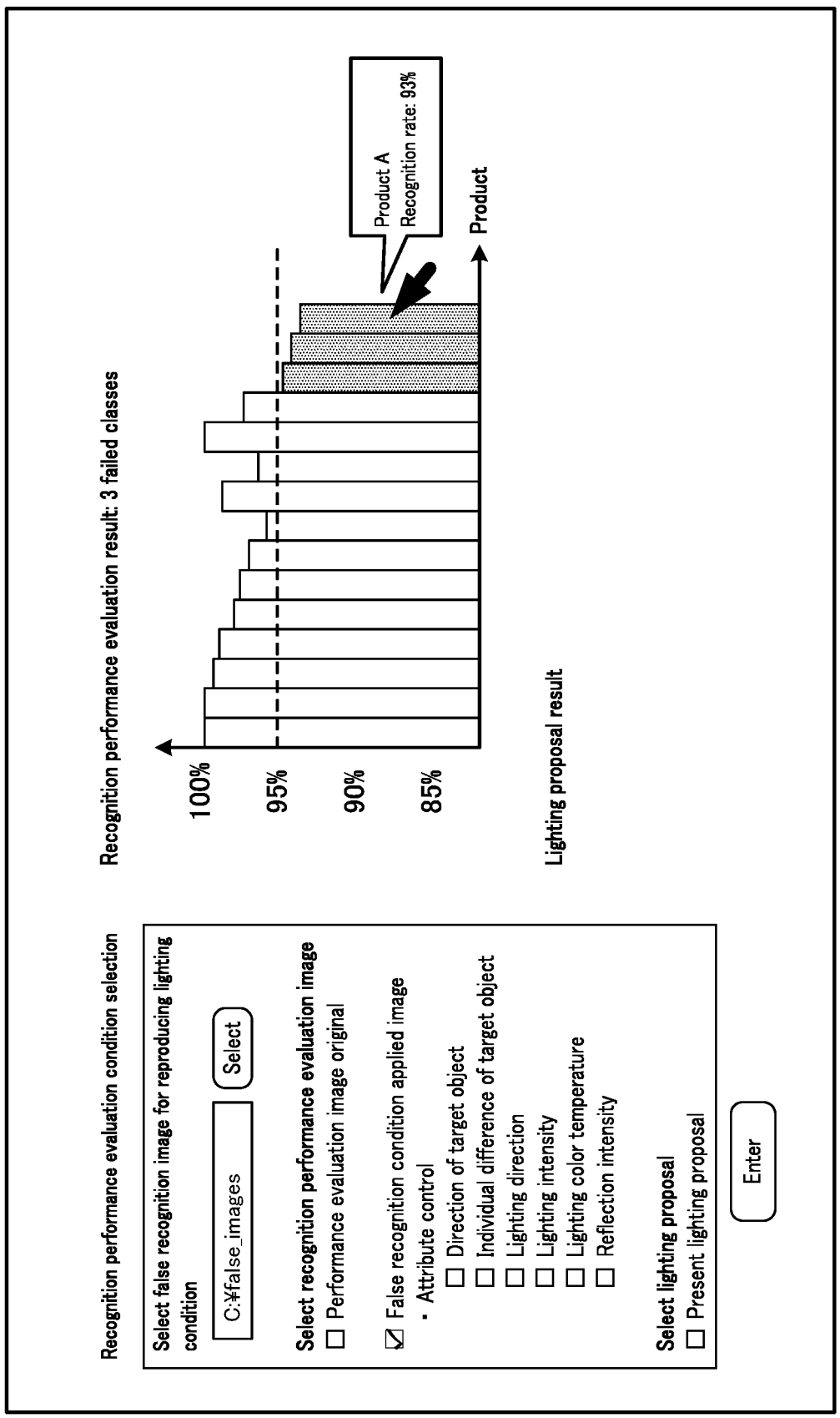
FIG. 4 illustrates another exemplary display of false recognition risk.
Figure 5:
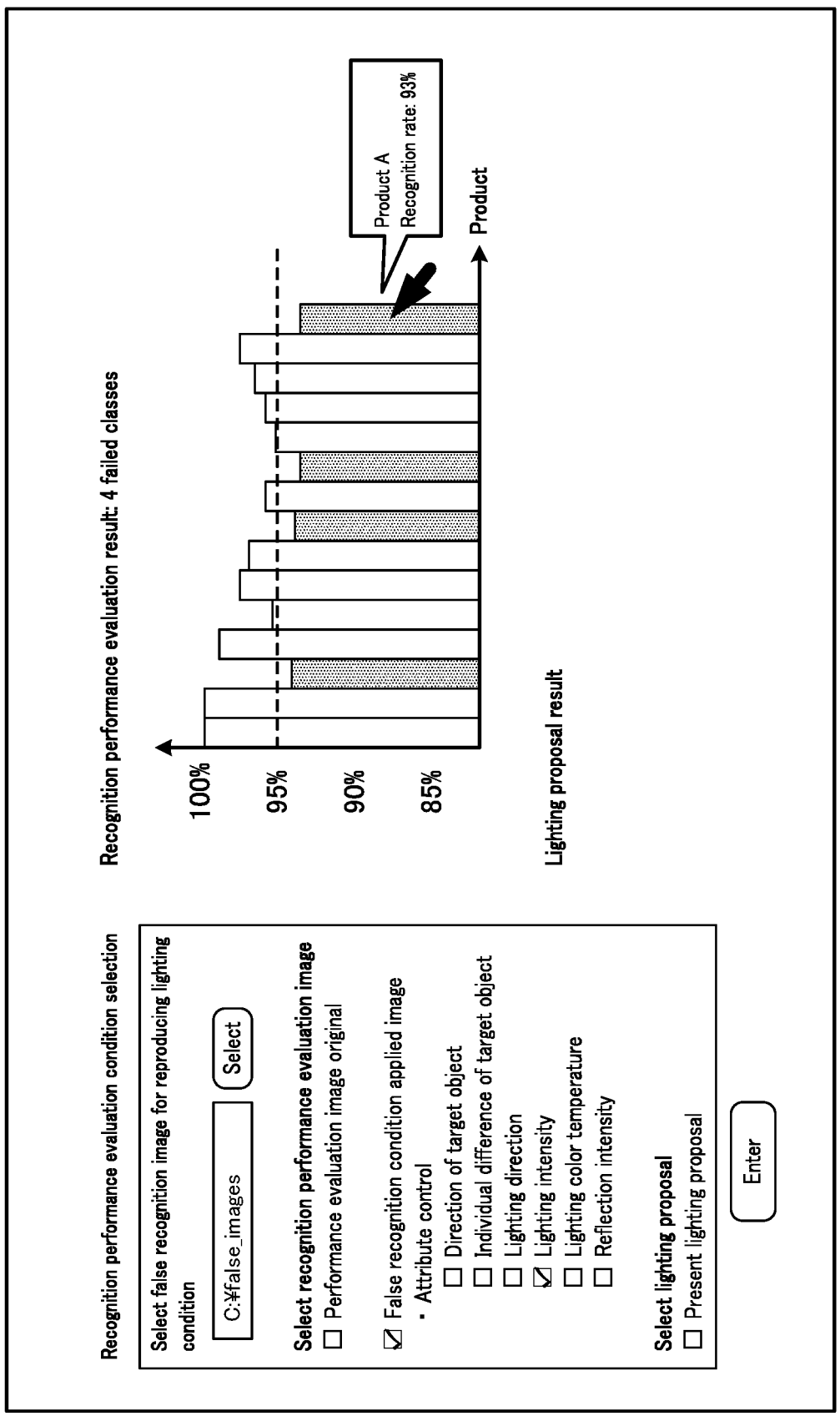
FIG. 5 illustrates still another exemplary display of false recognition risk.

Further, for example, as illustrated in FIG. 4 and FIG. 5, false recognition analyzer 14 may output, to result display 15, a signal for highlighting (e.g., highlighting such as coloring or patterning) a graph corresponding to a product with a recognition rate of the threshold or less. The highlighting makes it easier for a user to identify a product with a high possibility of false recognition.

Further, for example, as illustrated in FIG. 3 to FIG. 6, when a graph of a certain product (e.g., graph of product A in FIG. 3 to FIG. 6) is selected by an operation such as a mouseover or click in the graph display of the recognition rates of the respective products, information on the product such as a product name and a recognition rate may be displayed.

Note that the display of the recognition rate for each product is not limited to the graph display and may be another display such as a list display. The threshold is not limited to 95% and may be another value. For example, the threshold may be determined based on the recognition accuracy required in the operation of product recognition system 1. The threshold may also be configured variable.

In addition to the highlighting, false recognition analyzer 14 may output, to result display 15, a signal for displaying information on a product with a recognition rate exceeding the predetermined threshold distinguishing from information on a product with a recognition rate not exceeding the predetermined threshold.

Exemplary displays will be described with reference to FIG. 3 to FIG. 6. In these examples, a user can input to each of the "false recognition image selection for reproducing lighting condition", "recognition performance evaluation image selection", and "selection of lighting suggestion". Here, the "false recognition image selection for reproducing lighting condition" is an input section that receives selection of an image for extracting the lighting condition to be reflected in the performance evaluation images of the respective products. The "recognition performance evaluation image selection" is an input section that receives selection of which of an original image (performance evaluation image original) and an image to which a condition of false recognition is applied (false recognition condition applied image) is used for the recognition performance evaluation. When the "false recognition condition applied image" is selected, attributes to be applied or corrected can be further selected. The "selection of lighting suggestion" is an input section that receives selection of whether to request an automatic suggestion for lighting that causes less false recognition.

Figure 3:
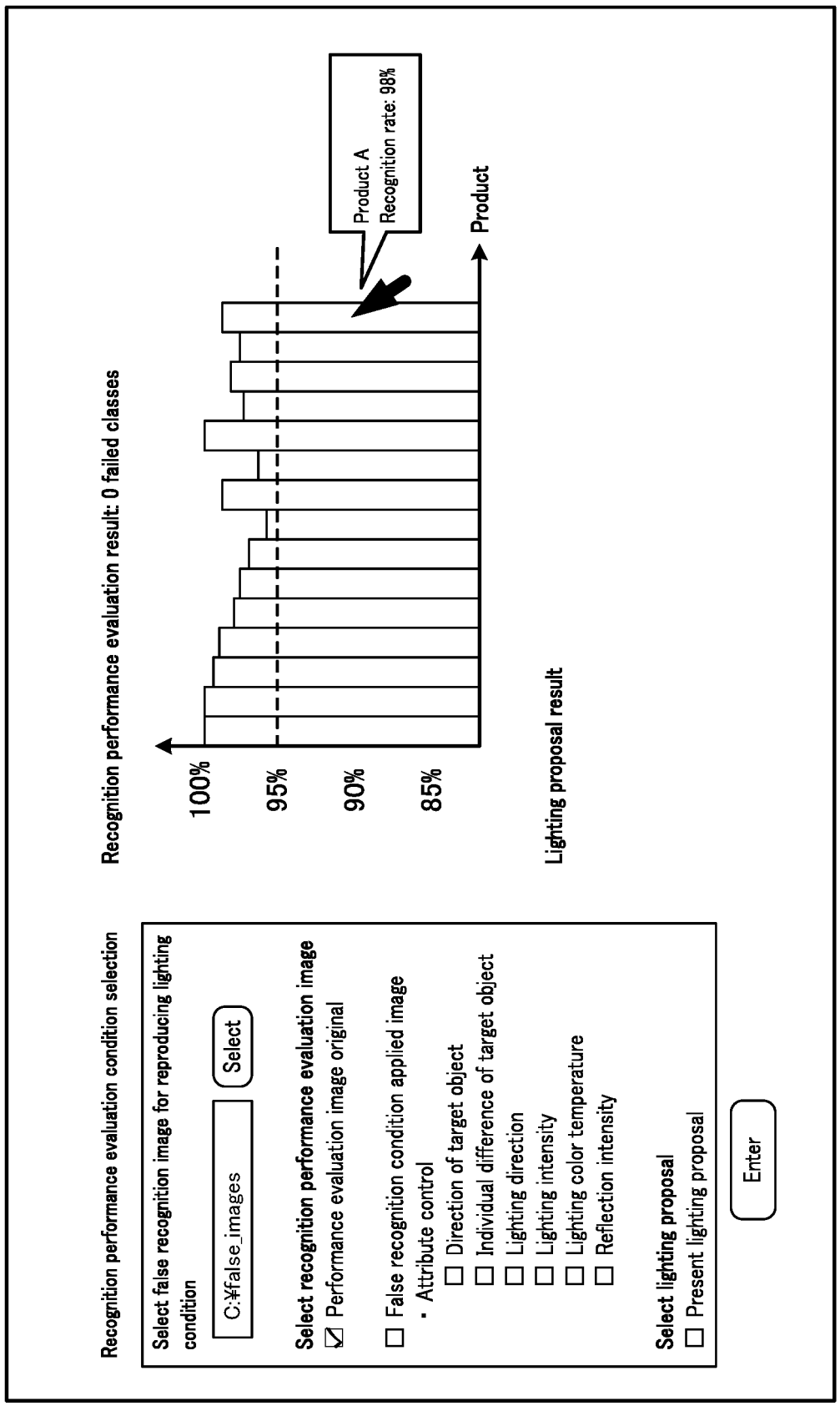
FIG. 3 illustrates an exemplary display of false recognition risk.

An exemplary display screen illustrated in FIG. 3 is for a case where a user selects the performance evaluation image original, does not select the false recognition condition applied image, and does not select the lighting suggestion. Note that FIG. 3 illustrates an example where no attribute of the false recognition image is applied to the performance evaluation image, and thus the false recognition image for reproducing the lighting condition need not be selected in FIG. 3, for example.

In the case of FIG. 3, for example, false recognition analyzer 14 may evaluate the recognition rate of the performance evaluation image original without applying a false recognition condition based on the false recognition image to the performance evaluation image original.

The product recognition model uses, for example, a model with a high recognition rate as a result of evaluation using the performance evaluation image original; accordingly, the recognition rate for the performance evaluation image original tends to be higher than the predetermined threshold (e.g., 95%). Thus, as illustrated in FIG. 3, for example, the recognition rates of all the products are possibly displayed higher than the threshold (95%) and the number of failed classes is possibly displayed as zero, as the evaluation result of the recognition performance for the performance evaluation image original.

An exemplary display screen illustrated in FIG. 4 is for a case where a user does not select the performance evaluation image original, selects the false recognition condition applied image, and does not select the lighting suggestion. In FIG. 4, for example, the false recognition image (file name: false_images) for reproducing the lighting condition is selected. Note that, in FIG. 4, it is assumed that the attributes of the false recognition image are applied as they are, and thus the "attribute control" is not checked individually.

In the case of FIG. 4, for example, false recognition analyzer 14 may apply, to the performance evaluation image original, a false recognition condition (e.g., lighting environment information) based on the selected false recognition image to generate the pseudo-evaluation image data, and evaluate the product recognition performance (e.g., recognition rate) for the pseudo-evaluation image data.

In the example illustrated in FIG. 4, it is displayed that the recognition rates for three products including product A are equal to or less than the threshold (95%) and the number of failed classes is three, as the evaluation result of the recognition performance for the pseudo-evaluation image data. The display screen illustrated in FIG. 4 allows a user to see the recognition performance (e.g., false recognition risk) across a plurality of products in the lighting environment similar to that for the product corresponding to the false recognition image. In the example of FIG. 4, the recognition rates for three products including product A are equal to or less than the threshold, so that the user can see the increased risk of false recognition.

An exemplary display screen illustrated in FIG. 5 is for a case where a user does not select the performance evaluation image original, selects the false recognition condition applied image, and does not select the lighting suggestion. Further, in FIG. 5, the attribute control of "lighting intensity" is selected, by way of example. In FIG. 5, for example, the false recognition image (file name: false_images) for reproducing the lighting condition is also selected. As a result, in FIG. 5, the false recognition risk is displayed in a case where the selected attribute among the attributes of the false recognition image (lighting intensity in FIG. 5) is reproduced.

In the case of FIG. 5, for example, false recognition analyzer 14 may apply, to the performance evaluation image original, the attribute control of the lighting intensity and a false recognition condition (e.g., lighting environment information) based on the selected false recognition image to generate the pseudo-evaluation image data, and evaluate the product recognition performance (e.g., recognition rate) for the pseudo-evaluation image data.

In the example illustrated in FIG. 5, it is displayed that the recognition rates for four products including product A are equal to or less than the threshold (95%) and the number of failed classes is four, as the evaluation result of the recognition performance for the pseudo-evaluation image data. The display screen illustrated in FIG. 5 allows a user to see the recognition performance (e.g., false recognition risk) across a plurality of products in the lighting environment similar to the lighting environment (false recognition condition) for the product corresponding to the false recognition image as well as in a condition other than the false recognition condition (lighting intensity change in FIG. 5). In the example illustrated in FIG. 5, the user can see the false recognition risk (e.g., potential false recognition risk) when the lighting intensity is further changed relative to the false recognition condition.

Note that, although a single attribute control operation is selected in FIG. 5, a plurality of attribute control operations may be selected.

Note that, in FIG. 3, FIG. 4, and FIG. 5, either one of the performance evaluation image original and the false recognition condition applied image is selected in the selection of the recognition performance evaluation image, but the present disclosure is not limited to this, and both the performance evaluation image original and the false recognition condition applied image may be selected. In this case, for example, the graph display illustrated in FIG. 3 for the case where the performance evaluation image original is selected and the graph display illustrated in FIG. 4 or FIG. 5 for the case where the false recognition condition applied image is selected may be both displayed. For example, the result of the recognition performance evaluation illustrated in FIG. 3 and the result of the recognition performance evaluation in FIG. 4 or FIG. 5 may be displayed side by side on the screen, may be individually displayed by screen switching, or may be displayed in a superimposed manner in a distinguishable form.

This allows the user to recognize the difference in the false recognition risk depending on whether the false recognition condition is applied and whether an additional condition is applied by the attribute control.

Figure 6:
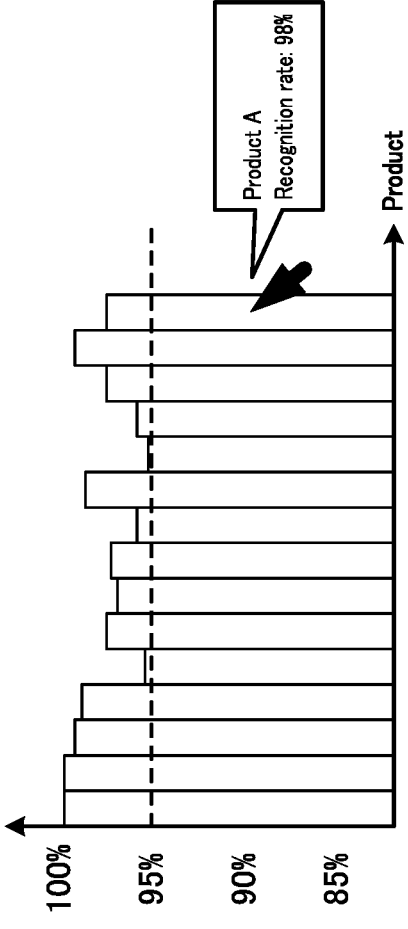
FIG. 6 illustrates still another exemplary display of false recognition risk.

The screen illustrated in FIG. 6 is for a case where a user does not select the performance evaluation image original, selects the false recognition condition applied image, and selects the lighting suggestion. In FIG. 6, for example, the false recognition image (file name: false_images) for reproducing the lighting condition is selected. In FIG. 6, the lighting condition based on the false recognition image is reproduced, and the false recognition risk is further displayed for a case where the lighting corresponding to the lighting suggestion is reflected.

In the case of FIG. 6, for example, false recognition analyzer 14 may apply, to the performance evaluation image original, a false recognition condition (e.g., lighting environment information) based on the selected false recognition image to generate the pseudo-evaluation image data, and evaluate the product recognition performance (e.g., recognition rate) for the pseudo-evaluation image data.

For example, there may be a product with a recognition rate equal to or less than the threshold as a result of the evaluation. For example, false recognition analyzer 14 may determine (e.g., search) a candidate for a configuration value for an attribute related to lighting (e.g., at least one of the lighting direction, intensity, and color temperature) that causes the recognition rates of a plurality of products (e.g., specified number of products or all products) to be higher than the threshold by attribute control, and may output, to result display 15, a signal for displaying a lighting suggestion result including the determined candidate for the configuration value (e.g., suggested value). In the example illustrated in FIG. 6, as the evaluation result of the recognition performance for the evaluation image in the suggested lighting environment, it is displayed that all recognition rates are higher than the threshold (95%) and the number of failed classes is zero. Further, in the example illustrated in FIG. 6, the light direction, intensity, and color temperature are each displayed as a result (e.g., configuration values of the attributes) related to the suggested lighting environment.

The display screen illustrated in FIG. 6 allows the user to confirm a lighting adjustment method (e.g., additional installation of lighting, or adjustment of the lighting direction, intensity, or color temperature) for reducing the false recognition risk in the lighting environment similar to the lighting environment (false recognition condition) for the product corresponding to the false recognition image.

Note that a condition of the lighting suggestion is not limited to the condition that causes the recognition rates of a plurality of (e.g., all) products to be higher than the threshold, and may be, for example, a condition that causes a lower number (e.g., minimum or equal to or less than a threshold) of products to have a recognition rate equal to or less than the threshold by attribute control related to lighting. Further, for example, when there are a plurality of attribute control operations (e.g., combination of attribute control operations) that cause the recognition rate to be higher than the threshold by the attribute control related to lighting, false recognition analyzer 14 may apply an attribute control operation that causes a higher (e.g., maximum) average value of the recognition rates of the plurality of products to the lighting suggestion result.

For example, false recognition analyzer 14 may make a lighting suggestion such that the recognition rate of a particular product is high based on user's specification, the price of a product, the sales amount, the content of advertising, etc. For example, an expensive product has a greater effect than other products when the false recognition occurs. In addition, since a popular product or a product on an advertisement is a frequent target of the product recognition, a low recognition rate causes a large number of false recognitions. Thus, even if the recognition rates of other products are slightly declined, making a lighting suggestion to improve the recognition rates of the above products reduces negative impact on sales and operations of a store as a whole.

Further, in FIG. 6, a parameter for determining the attribute control (e.g., candidate for an attribute configuration value) in the lighting suggestion by false recognition analyzer 14 may be selected by a user (i.e., manual method), or may be determined in advance in false recognition analyzer 14 (i.e., automatic method).

Figure 7A:
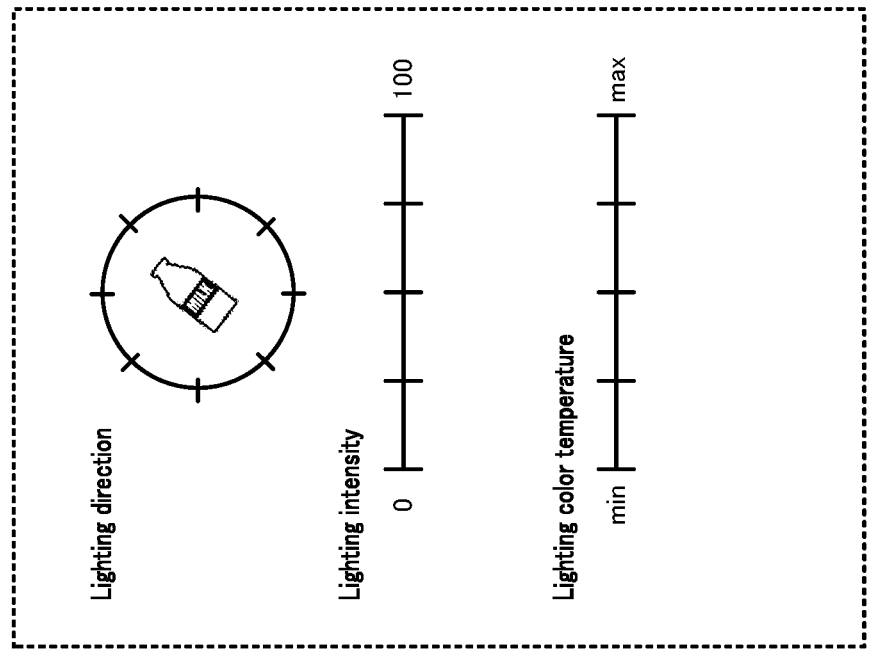
FIG. 7A illustrates an example of leading a lighting suggestion.
Figure 7B:
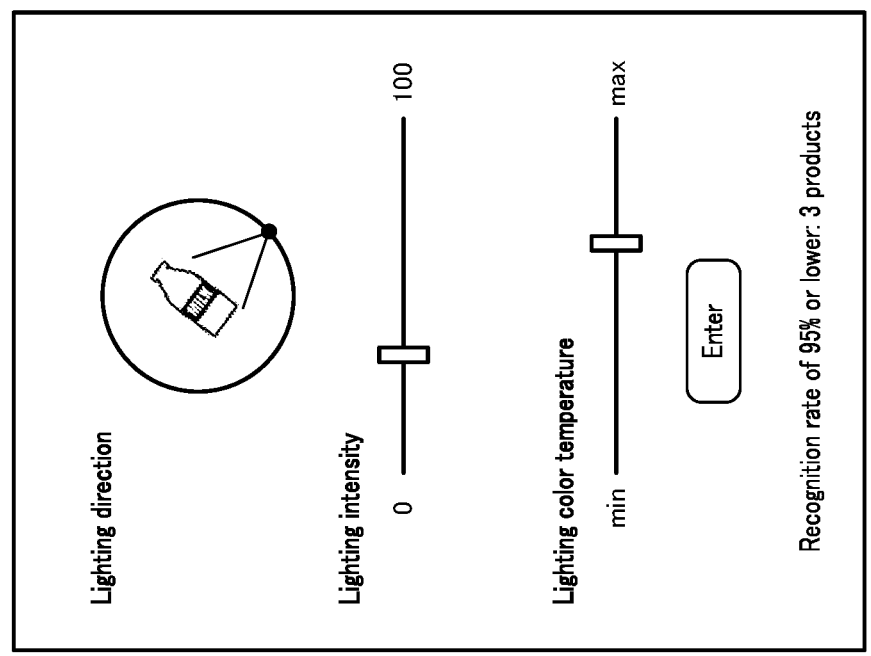
FIG. 7B illustrates another example of leading a lighting suggestion.

FIG. 7A illustrates an example of a manual search for the lighting environment, and FIG. 7B illustrates an example of an automatic search for the lighting environment.

FIG. 7A is an exemplary display screen that allows a user to select candidates for attributes related to the lighting environment (e.g., lighting direction, lighting intensity, and lighting color temperature). For example, when the user selects the lighting suggestion in FIG. 6, the display screen may be transitioned to the one in FIG. 7A.

In FIG. 7A, the user may, for example, specifies each of the parameters on the lighting direction (e.g., any of 360-degree directions), the lighting intensity (e.g., any of 0 to 100; 0 indicates the lighting off, and 100 indicates the maximum intensity of the lighting), and the lighting color temperature (e.g., any of the minimum to maximum values) for an evaluation target product, and press the "Enter" button. Upon detecting the pressing of the enter button, for example, false recognition analyzer 14 may receive the user's input, generate the pseudo-evaluation image data based on the selected lighting condition, and output, to result display 15, a signal for displaying the evaluation result of the recognition performance (e.g., the number of products with a recognition rate equal to or less than the threshold (95%)) for the pseudo-evaluation image data. This allows the user to specify a more appropriate lighting condition (e.g., condition with higher recognition rate) based on the display of the recognition rate according to the specification of the lighting condition, for example.

For example, the recognition rates of a plurality of products based on the lighting conditions determined in FIG. 7A may be displayed in a graph as illustrated in FIG. 6.

FIG. 7B illustrates exemplary combinations of candidates for attributes related to the lighting environment (e.g., lighting direction, lighting intensity, and lighting color temperature). In the example illustrated in FIG. 7B, there are eight candidates for the lighting direction, five candidates for the lighting intensity, and five candidates for the lighting color temperature.

False recognition analyzer 14 may, for example, generate the pseudo-evaluation image data for some or all of the combinations (200 (=8×5×5) patterns in FIG. 7B) of attributes related to the lighting environment, and evaluate the recognition performance (e.g., recognition rate) for the pseudo-evaluation image data. For example, false recognition analyzer 14 may determine, as the lighting suggestion result, a combination among the plurality of combinations of attributes related to the lighting environment that causes a lower number (e.g., minimum or equal to or less than a specified value) of products to have a recognition rate equal to or less than the threshold.

In this manner, the display of the lighting suggestion result allows false recognition analyzer 14 to prompt a user to adjust the lighting environment to reduce the false recognition risk. It is thus possible to reduce the false recognition risk without performing additional learning (or relearning), which is higher in cost than the evaluation of the product recognition, for example.

Note that false recognition analyzer 14 may determine not only a single lighting suggestion but also a plurality of suggestions. In addition, the combinations (or the number of candidates) of attributes related to the lighting environment is not limited to 200 patterns, and may include another number of patterns. Further, for example, at least one value of the attributes (e.g., lighting direction, intensity, and color temperature) illustrated in FIG. 7B may be fixed.

Although no attribute control operation is selected in FIG. 6 (e.g., as in FIG. 4), one or more attribute control operations may be selected as in FIG. 5.

In FIG. 6, the recognition rates of respective products are displayed in a graph based on the lighting suggestion result, but the present disclosure is not limited thereto. For example, the recognition rates of respective products based on the lighting suggestion result and the false recognition rates of respective products when the false recognition condition is applied (e.g., as in FIG. 4 or FIG. 5) may be displayed. This allows a user to visually confirm that the false recognition risk is reduced by the lighting suggestion.

Display Example 2

In Display Example 2, for the pseudo evaluation image data to which attribute information on the lighting environment for a product corresponding to the false recognition image is applied, for example, false recognition analyzer 14 may newly generate pseudo-evaluation image data by further adjusting at least one attribute information portion on a feature amount other than the lighting environment, and output, to result display 15, a signal for displaying the evaluation result (e.g., recognition rate, false recognition risk, or recognition score to be described later) for the new pseudo-evaluation image data.

By way of example, for a plurality of the new pseudo-evaluation image data portions generated by making different changes (i.e., adjustments or attribute control operations) to the attribute information of the evaluation image data, false recognition analyzer 14 may output, to result display 15, a signal for displaying a list of evaluation results (e.g., recognition rate, false recognition risk, or recognition score to be described later) respectively corresponding to the plurality of pseudo-evaluation image data portions.

FIG. 8 illustrates an exemplary display screen for the false recognition risk in Display Example 2.

The display screen illustrated in FIG. 8 includes, for example, areas of "false recognition image", "evaluation image" (e.g., registered evaluation image), "attribute control", "attribute control intensity", "pseudo-evaluation image", "recognition score", "recognition result", and "add to learning".

The "false recognition image" area may display, for example, image data of a product determined to be misrecognized in product recognizer 12.

The "registered evaluation image" area may display, for example, evaluation target images among the evaluation images registered in performance evaluation image DB 141. For example, the target product (evaluation image data) of the registered evaluation image may be determined by selection by at least one of false recognition analyzer 14 and a user. For example, for a product with a recognition rate equal to or less than the threshold (e.g., 95%) in Display Example 1, a list of recognition scores obtained by different attribute control operations may be displayed as in Display Example 2. Alternatively, a screen for prompting selection of a target product for the screen display in Display Example 2 from a plurality of products whose recognition rates are displayed in Display Example 1 may be displayed.

The "attribute control" area displays, for example, whether an attribute is controlled for the evaluation image and the type of attribute. FIG. 8 illustrates an example where a single attribute is displayed for each evaluation image, but a plurality of attributes may be displayed.

The "attribute control intensity" area displays, for example, the intensity of the attribute control displayed in the "attribute control" area. The attribute control intensity may indicate, for example, a value (level) indicating any of a plurality of candidates for the attribute control intensity, or may indicate an actual value (e.g., lighting direction [degree], lighting intensity [lx], and color temperature [K]) configured in each attribute control operation.

Note that the attribute to be controlled and the intensity of the attribute control may be selected by receiving an input from a user, or may be determined in advance by false recognition analyzer 14.

The "pseudo-evaluation image" area may display, for example, the pseudo-evaluation image obtained by applying a false recognition condition (e.g., condition related to the lighting environment) and the attribute control displayed in the "attribute control" and the "attribute control intensity" to the evaluation image. For example, in FIG. 8, the pseudo-evaluation image data obtained by applying the lighting condition corresponding to the false recognition image of a bottled beverage and the attribute control corresponding to the "attribute control" and "attribute control intensity" may be displayed. For example, in FIG. 8, when the attribute control for the evaluation image data of instant noodles is "N/A", the pseudo-evaluation image data of the instant noodles to which the lighting condition corresponding to the false recognition image of the bottled beverage is applied may be displayed. Further, for example, in FIG. 8, when the attribute control for the evaluation image data of the instant noodles is "direction change", the pseudo-evaluation image data of the instant noodles to which the lighting condition corresponding to the false recognition image of the bottled beverage is applied and the direction of which is changed may be displayed. Likewise, for example, in FIG. 8, when the attribute control for the evaluation image data of the instant noodles is "reflection", the pseudo-evaluation image data of the instant noodles to which the lighting condition corresponding to the false recognition image of the bottled beverage is applied and the light reflection intensity of which is changed may be displayed.

The "recognition score" area may display, for example, the evaluation result for the pseudo-evaluation image. As an example of the evaluation result, a recognition score may be displayed, which is an indicator of certainty of recognition of a correct class (correct product) estimated for the pseudo-evaluation image. For example, false recognition analyzer 14 may determine a recognition score indicating the certainty of each of a plurality of (e.g., all) classes for the product recognition result of the pseudo-evaluation image. The recognition score may be determined so that the result of the addition of the recognition scores for a plurality of classes is 1, for example (i.e., value normalized to a range of 0 to 1). For example, the closer the recognition score is to 1, the more certain the recognition result of the class is. In other words, the closer the recognition score is to zero, the higher the false recognition risk is.

For example, in FIG. 8, false recognition analyzer 14 may determine the recognition scores for a plurality of classes (e.g., a plurality of classes including instant noodles, snacks, miscellaneous goods, or beverages) in the product recognition result for the evaluation image data of the instant noodles, and display, on the screen, the recognition score for the instant noodles, which is a correct class, among the recognition scores for the plurality of classes.

The "recognition result" area may display, for example, either one of "false recognition" and "correct recognition" as the evaluation result by false recognition analyzer 14. For example, false recognition analyzer 14 may determine "correct recognition" when the recognition score for the correct class is the highest among the recognition scores for a plurality of classes, and may determine "false recognition" when the recognition score for a class other than the correct class is the highest.

The "add to learning" area may include, for example, a display prompting input of information for determining whether to perform relearning (or additional learning) using a plurality of pseudo-evaluation image data portions (e.g., whether to add to learning data) in the list display. For example, the user may select the check box displayed in the "add to learning" and determine to add the corresponding pseudo-evaluation image data to the learning data. False recognition analyzer 14 may add, to the learning data, the pseudo-evaluation image data whose recognition result is the false recognition (e.g., select the check box of "add to learning"). Alternatively, false recognition analyzer 14 may add, to the learning data, the pseudo-evaluation image data whose recognition score is equal to or less than a threshold (e.g., select the check box of "add to learning"). It is possible to more accurately determine the false recognition by adding, to the learning data, the pseudo-evaluation image data whose recognition result is the false recognition or whose recognition score is equal to or less than the threshold, as an image that is likely to cause the false recognition.

In addition, the user's time and effort for checking the box may be saved by automatically selecting a check box of the "add to learning" for the pseudo-evaluation image data satisfying a predetermined condition, or providing a button to receive an indication for automatically selecting the check box. Further, the selection of the learning data may be automated by automatically adding the pseudo-evaluation image data to the learning data without requesting confirmation of the user. In this case, the displaying of the check box itself may be skipped. The criteria for automatically performing the selection includes, for example, the recognition result being the false recognition or the recognition score being equal to or less than the threshold.

For example, when detecting the pressing of an "output" button (not illustrated), false recognition analyzer 14 may add the pseudo-evaluation image data selected in the "add to learning" to the learning data.

Here, the pseudo-evaluation image data with a lower recognition score for the correct class has a higher effect of improving the recognition rate by relearning, and thus is expected to be added to the learning data. For example, when the value of the "recognition score" is equal to or less than the threshold, false recognition analyzer 14 may output information for highlighting the area of the recognition score, as illustrated in FIG. 9, to result display 15. Note that the area to be highlighted is not limited to the recognition score, and may include another area of the corresponding pseudo-evaluation image data. The highlighting allows false recognition analyzer 14 to prompt the user to add the corresponding pseudo-evaluation image data to the learning data.

Note that the pseudo-evaluation image data determined as "correct recognition" may be additionally learned as the data of the correct class. Generally, the higher the recognition rate is, the more difficult it is to improve. Thus, the effect is reduced when the threshold for determining "correct recognition" is sufficiently high. But this additional learning can still be expected to improve the accuracy.

As described above, according to Display Example 2, candidates for images to be added to the learning data are displayed for the recognition target that is possibly misrecognized. This allows the user to, for example, easily add an image having a higher risk of false recognition (e.g., image with lower recognition score) to the learning data, thereby improving the product recognition accuracy by additional learning and reducing the false recognition risk.

Further, for example, the pseudo-evaluation image data having a high risk of false recognition is more likely to be added to the learning data. That is, the pseudo-evaluation image data having a lower risk of false recognition is less likely to be added to the learning data, and it is thus possible to, for example, prevent an increase in the product image data to be added to the learning processing. Since a processing cost of the learning processing is higher than that of the evaluation of the product recognition, the relearning efficiency is expected to be improved.

Note that the contents displayed in FIG. 8 and FIG. 9 are merely examples, and not limited thereto. For example, some of the information such as the false recognition image, registered evaluation image, attribute control, attribute control intensity, pseudo-evaluation image, recognition score, recognition result, and add to learning illustrated in FIG. 8 and FIG. 9 may be displayed, or different information may be displayed in addition to some of the information.

Exemplary displays of the false recognition risk have been described, thus far.

As described above, false recognition analyzer 14 pseudo-generates, based on attribute information of false recognition image data obtained by capturing a product in an environment where false recognition of the product has occurred, image data of a different product (i.e., simulates an image in which the different product is placed) in the environment (e.g., lighting environment) where the false recognition has occurred, evaluates the accuracy of image recognition (e.g., false recognition risk) for the different product, and outputs a signal for displaying (visualizing) an evaluation result of the accuracy of image recognition.

This allows false recognition analyzer 14 to determine (or evaluate) the false recognition risk of the product other than the product for which the false recognition has occurred, for example, in the environment where the false recognition of the product has occurred. Thus, false recognition analyzer 14 can evaluate the accuracy of image recognition for a different object, for example, when the different object is a target of the image recognition in a particular environment.

For example, in addition to a product misrecognized in alighting environment other than a learning environment, the user can see the risk of false recognition for another product in the lighting environment where the false recognition has occurred, and can take actions such as additional learning and adjustment of the lighting environment, for example, in accordance with the risk of false recognition. Thus, the present embodiment makes it possible to prevent the false recognition of an object in a recognition environment where another object has been misrecognized, thereby reducing the false recognition rate of the image recognition.

Note that the place where the product recognition is performed in product recognition system 1 is not limited to indoors (e.g., inside of a store) and may be outdoors. For example, false recognition analyzer 14 may convert the evaluation image data based on an attribute (e.g., false recognition condition) related to the light environment due to at least one of the lighting environment and sunlight.

In FIG. 3 to FIG. 6, a description has been given of a case where the false recognition risk (e.g., recognition rate) is displayed in a graph, but a display form of the false recognition risk is not limited to the graph display and may be another display form (e.g., list display).

In FIG. 3 to FIG. 6, the areas of "recognition performance evaluation condition selection", "recognition performance evaluation result", and "lighting suggestion result" are displayed on a single screen, but the present disclosure is not limited thereto, and at least one area of the "recognition performance evaluation condition selection", "recognition performance evaluation result", and "lighting suggestion result" may be displayed on another screen.

For example, the components included in product recognition system 1 may be provided at a place where the product recognition is performed (e.g., store). Alternatively, for example, image acquirer 11 and result display 15 among the components included in product recognition system 1 may be provided at a place where the product recognition is performed (e.g., store), and the other components may be provided at a place physically separated from image acquirer 11 and result display 15 (e.g., at least one server). For example, at least one of processes of the false recognition risk evaluation may be performed in a server.

Further, in the above-described embodiments, a product displayed in a store is described as an example of an evaluation target object for the false recognition risk (or image recognition target), but the evaluation target object for the false recognition risk is not limited to the product. That is, disclosed contents of the present embodiment are applicable in a facility other than a store or to an object other than a product in a situation where the false recognition risk of an object other than the object misrecognized in image recognition is evaluated under the false recognition condition.

Further, the pseudo-evaluation image data may be generated using a general image processing technique other than Generation Methods 1 to 3 described in the above-described embodiments. Specific examples include a change in the shape or direction of a product by geometric transformation, a change in saturation or color tone, and the like. In these cases, the shape or a distribution of the color, for example, may be extracted from the image data determined to be misrecognized, and used as an attribute.

In the above-described embodiments, a description has been given of a case where an attribute related to the lighting environment of image data determined to be misrecognized is applied to evaluation image data, but not only the attribute related to the lighting environment of the image data determined to be misrecognized, but also that of image data determined to be not misrecognized (e.g., image data determined to be correctly recognized), for example, may be applied to the evaluation image data. As a result, image data for a plurality of objects in various recognition environments can be simulated by image processing (e.g., attribute control) without taking an image in a real environment, and it is thus possible to easily evaluate the accuracy of image recognition for a plurality of objects.

Further, any component with a suffix, such as "-er", "-or", or "-ar" in the above-described embodiments may be replaced with other terms such as "circuit (circuitry)", "assembly", "device", "unit", or "module".

Embodiments according to the present disclosure have been described above with reference to the drawings, but the functions of product management system 1 described above can be realized by a computer program.

Figure 10:
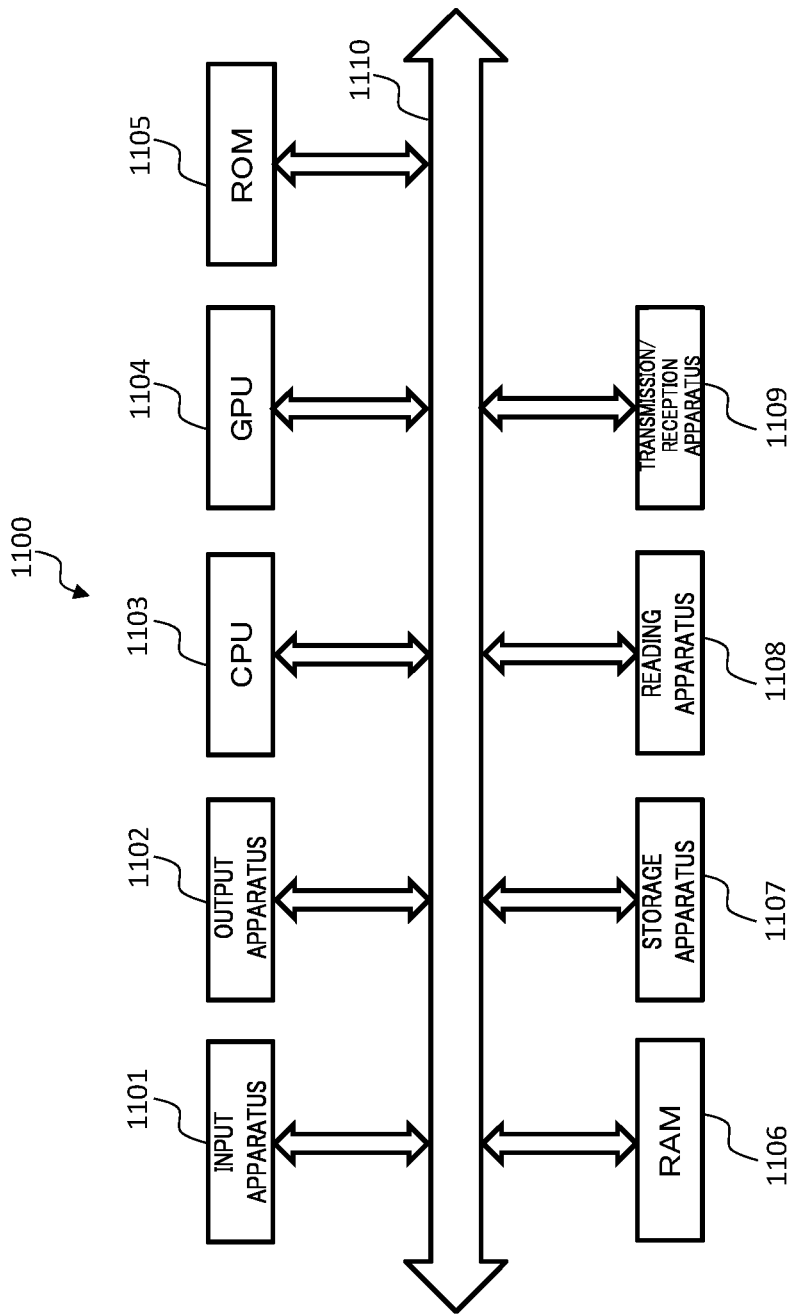
FIG. 10 illustrates an exemplary hardware configuration of a computer.

FIG. 10 illustrates a hardware configuration of a computer that implements functions of respective apparatuses by programs. This computer 1100 includes input apparatus 1101 such as a keyboard, mouse, or touch pad, output apparatus 1102 such as a display or speaker, central processing unit (CPU) 1103, graphics processing unit (GPU) 1104, read only memory (ROM) 1105, random access memory (RAM) 1106, storage apparatus 1107 such as a hard disk apparatus or solid state drive (SSD), reading apparatus 1108 for reading information from a recording medium such as a digital versatile disk read only memory (DVD-ROM) or universal serial bus (USB) memory, and transmission/reception apparatus 1109 for performing communication via a network, and these components are connected by bus 1110.

Reading apparatus 1108 reads programs for implementing functions of the respective apparatuses from a recording medium that stores the programs, and stores the programs in storage apparatus 1107. Alternatively, transmission/reception apparatus 1109 communicates with a server apparatus connected to the network, and stores, in storage apparatus 1107, the programs for implementing functions of the respective apparatuses downloaded from the server apparatus.

Then, CPU 1103 copies the programs stored in storage apparatus 1107 to RAM 1106, sequentially reads instructions included in the programs from RAM 1106, and executes the instructions, thereby implementing the functions of the respective apparatuses.

The present disclosure can be realized by software, hardware, or software in cooperation with hardware.

Each functional block used in the description of each embodiment described above can be partly or entirely realized by an LSI such as an integrated circuit, and each process described in the each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI here may be referred to as an IC, a system LSI, a super LSI, or an ultra LSI depending on a difference in the degree of integration.

However, the technique of implementing an integrated circuit is not limited to the LSI and may be realized by using a dedicated circuit, a general-purpose processor, or a special-purpose processor. In addition, a FPGA (Field Programmable Gate Array) that can be programmed after the manufacture of the LSI or a reconfigurable processor in which the connections and the settings of circuit cells disposed inside the LSI can be reconfigured may be used. The present disclosure can be realized as digital processing or analogue processing.

If future integrated circuit technology replaces LSIs as a result of the advancement of semiconductor technology or other derivative technology, the functional blocks could be integrated using the future integrated circuit technology. Biotechnology can also be applied.

The present disclosure can be realized by any kind of apparatus, device or system having a function of communication, which is referred to as a communication apparatus. The communication apparatus may comprise a transceiver and processing/control circuitry. The transceiver may comprise and/or function as a receiver and a transmitter. The transceiver, as the transmitter and receiver, may include an RF (radio frequency) module including amplifiers, RF modulators/demodulators and the like, and one or more antennas. Some non-limiting examples of such a communication apparatus include a phone (e.g., cellular (cell) phone, smart phone), a tablet, a personal computer (PC) (e.g., laptop, desktop, netbook), a camera (e.g., digital still/video camera), a digital player (digital audio/video player), a wearable device (e.g., wearable camera, smart watch, tracking device), a game console, a digital book reader, a telehealth/telemedicine (remote health and medicine) device, and a vehicle providing communication functionality (e.g., automotive, airplane, ship), and various combinations thereof.

The communication apparatus is not limited to be portable or movable, and may also include any kind of apparatus, device or system being non-portable or stationary, such as a smart home device (e.g., an appliance, lighting, smart meter, control panel), a vending machine, and any other "things" in a network of an "Internet of Things (IoT)".

Recently, in the Internet of Things (IoT) technology, Cyber Physical Systems (CPS), a new concept that creates new added value by information linkage between physical space and cyber space, has been attracting attention. This CPS concept is applicable to the above embodiments.

That is, as a basic configuration of the CPS, for example, an edge server located in physical space and a cloud server located in cyber space can be connected via a network, and processing can be distributed by processors on both servers. Here, each processing data generated in the edge server or cloud server is preferably generated on a standardized platform, and the use of such a standardized platform facilitates efficiency in building a system that includes various and diverse sensor groups and IoT application software.

In the above embodiment, for example, the edge server may be placed in a store, and perform the product recognition processing and product false recognition risk evaluation processing. The cloud server may perform model learning using, for example, data received from the edge server via the network. Alternatively, for example, the edge server may be placed in a store to perform the product recognition processing, and the cloud server may perform the product false recognition risk evaluation processing using the data received from the edge server via the network.

The communication may include exchanging data through, for example, a cellular system, a wireless LAN system, a satellite system, etc., and various combinations thereof.

The communication apparatus may comprise a device such as a controller or a sensor which is coupled to a communication device performing a function of communication described in the present disclosure. For example, the communication apparatus may comprise a controller or a sensor that generates control signals or data signals which are used by a communication device performing a communication function of the communication apparatus.

The communication apparatus also may include an infrastructure facility, such as a base station, an access point, and any other apparatus, device or system that communicates with or controls apparatuses such as those in the above non-limiting examples.

Although various embodiments have been described above with reference to the drawings, (it goes without saying that) the present disclosure is not limited to foregoing embodiments. It is obvious that those skilled in the art can conceive various modifications or variations within the scope recited in the claims, and such modifications and variations also naturally fall within the technical scope of the present disclosure. Further, any components in the embodiments described above may be combined as appropriate without departing from the gist of the present disclosure.

The specific examples of the present disclosure have been described in detail above, but these are merely examples and do not limit the scope of the claims. The techniques described in the claims include various variations and modifications of the specific examples described above.

An information processing apparatus according to an embodiment of the present disclosure includes: generation circuitry, which, in operation, generates, based on attribute information of first image data resulting from capturing a first object in a first environment, second image data that simulates an image in which a second object other than the first object is placed in the first environment; evaluation circuitry, which, in operation, evaluates accuracy of image recognition for the second object based on the second image data; and output circuitry, which, in operation, outputs an evaluation result of the accuracy.

In an embodiment of the present disclosure, the evaluation result includes information indicating a probability of successful recognition of the second object in the second image data in the image recognition, and the output circuitry outputs a signal for displaying the information indicating the probability of successful recognition of the second object in the second image data.

In an embodiment of the present disclosure, the output circuitry outputs a signal for displaying information of the second object with the probability of successful recognition of the second object in the second image data exceeding a predetermined threshold distinguishing from information of the second object with the probability not exceeding the predetermined threshold.

In an embodiment of the present disclosure, the generation circuitry generates the second image data by making a change of the attribute information of image data resulting from capturing the second object based on the attribute information of the first image data.

In an embodiment of the present disclosure, the generation circuitry generates the second image data by applying, to the image data resulting from capturing the second object, first attribute information related to a lighting environment for the image recognition among the attribute information of the first image data.

In an embodiment of the present disclosure, the evaluation result includes information indicating a probability of successful recognition of the second object in the second image data in the image recognition, and when the probability is equal to or less than a threshold, the output circuitry outputs a signal for displaying a candidate for a configuration value of the first attribute information that causes the probability to be greater than the threshold.

In an embodiment of the present disclosure, a parameter determining the candidate for the configuration value is determined in advance or selected by a user.

In an embodiment of the present disclosure, the generation circuitry generates new second image data by further adjusting, with respect to the second image data, at least one of second attribute information portions related to a feature amount other than the lighting environment, and the output circuitry outputs a signal for displaying the evaluation result for the new second image data.

In an embodiment of the present disclosure, for a plurality of pieces of the new second image data generated by respectively making different adjustments for the second attribute information portions, the output circuitry outputs a signal for displaying a list of a plurality of the evaluation results respectively corresponding to the plurality of pieces of new second image data.

In an embodiment of the present disclosure, the output circuitry outputs a signal for displaying in the list an indication prompting input of information for determining whether to perform relearning using a plurality of pieces of the second image data after the change is made.

In an embodiment of the present disclosure, the generation circuitry generates the second image data using generative adversarial networks (GAN).

An information processing method according to an embodiment of the present disclosure includes: generating, by an information processing apparatus, based on attribute information of first image data resulting from capturing a first object in a first environment, second image data that simulates an image in which a second object other than the first object is placed in the first environment; evaluating, by the information processing apparatus, accuracy of image recognition for the second object based on the second image data; and outputting, by the information processing apparatus, an evaluation result of the accuracy.

A program according to an embodiment of the present disclosure causes a computer to perform processing, the processing including: generating, based on attribute information of first image data resulting from capturing a first object in a first environment, second image data that simulates an image in which a second object other than the first object is placed in the first environment; evaluating accuracy of image recognition for the second object based on the second image data; and outputting an evaluation result of the accuracy.

The disclosure of Japanese Patent Application No. 2021-077603, filed on Apr. 30, 2021, including the specification, drawings and abstract, is incorporated herein by reference in its entirety.

INDUSTRIAL APPLICABILITY

An exemplary embodiment of the present disclosure is useful for product recognition systems.

REFERENCE SIGNS LIST

1 Product recognition system
11 Image acquirer
12 Product recognizer
13 Storage
14 False recognition analyzer
15 Result display
141 Performance evaluation image database
142 Image encoder
143 Attribute controller
144 Image generator
145 Evaluator

The invention claimed is:
1. An information processing apparatus, comprising:
generation circuitry, which, in operation, generates, based on attribute information of first image data resulting from capturing a first object in a first environment, second image data that simulates an image in which a second object other than the first object is placed in the first environment, wherein simulation of the image includes changing a direction of lights;
evaluation circuitry, which, in operation, evaluates accuracy of image recognition for the second object based on the second image data; and
output circuitry, which, in operation, outputs an evaluation result of the accuracy,
wherein
the evaluation result includes information indicating a probability of successful recognition of the second object in the second image data in the image recognition,
the output circuitry outputs a signal for displaying the information indicating the probability of successful recognition of the second object in the second image data, and
the output circuitry outputs a signal for displaying information of the second object with the probability of successful recognition of the second object in the second image data exceeding a predetermined threshold distinguishing from information of the second object with the probability not exceeding the predetermined threshold.

2. The information processing apparatus according to claim 1, wherein the generation circuitry generates the second image data by making a change of the attribute information of image data resulting from capturing the second object based on the attribute information of the first image data.

3. The information processing apparatus according to claim 2, wherein the generation circuitry generates the second image data by applying, to the image data resulting from capturing the second object, first attribute information related to a lighting environment for the image recognition among the attribute information of the first image data.

4. The information processing apparatus according to claim 3, wherein,
when the probability is equal to or less than a threshold, the output circuitry outputs a signal for displaying a candidate for a configuration value of the first attribute information that causes the probability to be greater than the threshold.

5. The information processing apparatus according to claim 4, wherein, a parameter determining the candidate for the configuration value is determined in advance or selected by a user.

6. The information processing apparatus according to claim 3, wherein,
the generation circuitry generates new second image data by further adjusting, with respect to the second image data, at least one of second attribute information portions related to a feature amount other than the lighting environment, and
the output circuitry outputs a signal for displaying the evaluation result for the new second image data.

7. The information processing apparatus according to claim 6, wherein, for a plurality of pieces of the new second image data generated by respectively making different adjustments for the second attribute information portions, the output circuitry outputs a signal for displaying a list of a plurality of the evaluation results respectively corresponding to each of the plurality of pieces of new second image data.

8. The information processing apparatus according to claim 7, wherein the output circuitry outputs a signal for displaying in the list an indication prompting input of information for determining whether to perform relearning using a plurality of pieces of the second image data after the change is made.

9. The information processing apparatus according to claim 1, wherein the first image data is image data determined to be misrecognized in the image recognition.

10. The information processing apparatus according to claim 1, wherein the generation circuitry generates the second image data using generative adversarial networks (GAN).

11. An information processing method, comprising:
generating, by an information processing apparatus, based on attribute information of first image data resulting from capturing a first object in a first environment, second image data that simulates an image in which a second object other than the first object is placed in the first environment, wherein simulation of the image includes changing a direction of lights;
evaluating, by the information processing apparatus, accuracy of image recognition for the second object based on the second image data; and
outputting, by the information processing apparatus, an evaluation result of the accuracy, wherein
the evaluation result includes information indicating a probability of successful recognition of the second object in the second image data in the image recognition, and
the information processing method further comprises:
outputting a signal for displaying the information indicating the probability of successful recognition of the second object in the second image data, and
outputting a signal for displaying information of the second object with the probability of successful recognition of the second object in the second image data exceeding a predetermined threshold distinguishing from information of the second object with the probability not exceeding the predetermined threshold.

12. A non-transitory computer readable storage medium that stores a program causing a computer to perform processing, the processing comprising:
generating, based on attribute information of first image data resulting from capturing a first object in a first environment, second image data that simulates an image in which a second object other than the first object is placed in the first environment, wherein simulation of the image includes changing a direction of lights;
evaluating accuracy of image recognition for the second object based on the second image data; and
outputting an evaluation result of the accuracy, wherein
the evaluation result includes information indicating a probability of successful recognition of the second object in the second image data in the image recognition, and
the processing further comprises:
outputting a signal for displaying the information indicating the probability of successful recognition of the second object in the second image data, and
outputting a signal for displaying information of the second object with the probability of successful recognition of the second object in the second image data exceeding a predetermined threshold distinguishing from information of the second object with the probability not exceeding the predetermined threshold.

* * * * *